United States Patent
Kim et al.

(10) Patent No.: US 8,619,678 B2
(45) Date of Patent: Dec. 31, 2013

(54) WIRELESS DEVICE IN MULTICARRIER SYSTEM

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 13/143,329

(22) PCT Filed: Jan. 5, 2010

(86) PCT No.: PCT/KR2010/000035
§ 371 (c)(1),
(2), (4) Date: Aug. 9, 2011

(87) PCT Pub. No.: WO2010/077121
PCT Pub. Date: Jul. 8, 2010

(65) Prior Publication Data
US 2011/0286397 A1     Nov. 24, 2011

Related U.S. Application Data

(60) Provisional application No. 61/142,379, filed on Jan. 5, 2009.

(51) Int. Cl.
*H04W 80/04*     (2009.01)
(52) U.S. Cl.
USPC ........................................................ 370/328

(58) Field of Classification Search
None
See application file for complete search history.

(56) References Cited

U.S. PATENT DOCUMENTS

| | | |
|---|---|---|
| 2006/0159003 A1 | 7/2006 | Nanda et al. |
| 2007/0242769 A1 | 10/2007 | Yang |
| 2008/0112340 A1* | 5/2008 | Luebke ......................... 370/310 |
| 2008/0198902 A1* | 8/2008 | Malladi ......................... 375/134 |
| 2008/0225964 A1* | 9/2008 | Han et al. ...................... 375/260 |
| 2009/0167521 A1* | 7/2009 | Edwards et al. ............ 340/539.1 |
| 2010/0110994 A1* | 5/2010 | Ratsuk et al. ................. 370/329 |
| 2010/0182975 A1* | 7/2010 | Malladi et al. ................ 370/330 |
| 2011/0096703 A1* | 4/2011 | Nentwig et al. .............. 370/294 |

FOREIGN PATENT DOCUMENTS

EP     01944896     7/2008

* cited by examiner

*Primary Examiner* — John Blanton
(74) *Attorney, Agent, or Firm* — Lee, Hong, Degerman, Kang & Waimey

(57) ABSTRACT

A wireless device and method for a multiple carrier system are provided. The wireless device comprises a carrier management unit for determining at least one of a plurality of carriers as a reference carrier for monitoring a control channel and a control channel unit for monitoring the control channel over the reference carrier, wherein the carrier management unit switches the reference carrier to at least one of remaining carriers of the plurality of carriers. Accordingly, control channel traffic can be prevented from concentrating on a particular carrier, and a diversity gain can be achieved.

14 Claims, 12 Drawing Sheets

WIRELESS DEVICE IN MULTICARRIER SYSTEM

CROSS-REFERENCE TO RELATED APPLICATIONS

This application is the National Stage filing under 35U.S.C. 371 of International Application No. PCT/KR2010/000035, filed on Jan. 5, 2010, which claims the benefit of U.S. Provisional Application Ser. No. 61/142,379, filed on Jan. 5, 2009, the contents of which are all hereby incorporated by reference herein in their entirety.

TECHNICAL FIELD

The present invention relates to wireless communication, and more particularly, to a wireless device and a communication method for supporting multiple carriers.

BACKGROUND ART

Wireless communication systems are widely deployed in order to provide various kinds of communication services, such as voice and data. In general, the wireless communication system is a multiple access system which can support communication with multiple users by sharing available system resources (bandwidth, transmission power, etc.). Examples of the multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system and the like.

In a common wireless communication system, only one carrier is chiefly taken into consideration although the bandwidth between uplink and downlink is differently set. Hereafter, the carrier is defined by the center frequency and the bandwidth. The multiple carrier system uses a plurality of carriers having a bandwidth smaller than the entire bandwidth.

For example, a current 3GPP LTE (long term evolution) system based on the 3GPP ($3^{rd}$ Generation Partnership Project) TS (Technical Specification) Release 8 supports only one bandwidth (i.e., one carrier) of {1.4, 3.5. 10, 15, 20} MHz bandwidths. In order to support the total bandwidth of 40 MHz, the multiple carrier system uses two carriers each having a 20 MHz bandwidth or uses three carriers having a 20 MHz bandwidth, a 15 MHz bandwidth, and 5 MHz bandwidth, respectively.

The multiple carrier system is advantageous in that it can guarantee backward compatibility with the existing system and can greatly increase the data rate through multiple carriers.

3GPP LTE is based on dynamic scheduling in order to transmit and receive downlink data and uplink data.

In order to transmit downlink data, a base station first informs a user equipment of downlink resource allocation (this is called a downlink grant) through a control channel. The user equipment receives the downlink data through a downlink data channel indicated by the downlink resource allocation.

In order to transmit uplink data, a user equipment first transmits an uplink resource allocation request (this is called a scheduling request) to a base station. The base station which has received the uplink resource allocation request informs the user equipment of uplink resource allocation (this is called an uplink grant) through a control channel. The user equipment transmits the uplink data through an uplink data channel indicated by the uplink resource allocation.

There is a need for a scheme for performing dynamic scheduling more reliably in a multiple carrier system.

DISCLOSURE

Technical Problem

An object of the present invention is to provide a wireless device and method for switching a reference carrier in a multiple carrier system.

Technical Solution

In an aspect, a wireless device for a multiple carrier system includes a carrier management unit for determining at least one of a plurality of carriers as a reference carrier for monitoring a control channel and a control channel unit for monitoring the control channel over the reference carrier, wherein the carrier management unit switches the reference carrier to at least one of the remaining carriers of the plurality of carriers.

The carrier management unit may switch the carrier used as the reference carrier according to indication from a base station.

The carrier management unit may switch the carrier used as the reference carrier based on carrier indices for the plurality of carriers.

The carrier management unit may switch the carrier used as the reference carrier based on a hopping pattern.

The carrier management unit may periodically switch the carrier used as the reference carrier.

The wireless device may further include a data channel unit for transmitting a data packet over a downlink data channel or transmitting a data packet over an uplink data channel by using resource allocation received on the control channel.

In another aspect, a communication method in a multiple carrier system includes determining a hopping pattern for switching a reference carrier for monitoring a control channel, determining a first carrier, selected from among a plurality of carriers, as the reference carrier, and monitoring the control channel over the reference carrier and switching the reference carrier to a second carrier, selected from among the plurality of carriers, based on the hopping pattern.

In yet another aspect, a base station for a multiple carrier system includes a carrier management unit for determining at least one of a plurality of carriers as a reference carrier for transmitting a control channel and a transmission unit for transmitting the control channel over the reference carrier, wherein the carrier management unit switches the reference carrier to at least one of remaining carriers of the plurality of carriers.

Advantageous Effects

The concentration of control channel traffic on a specific carrier can be prevented, and a diversity gain can be obtained.

MODE FOR INVENTION

Figure 1:
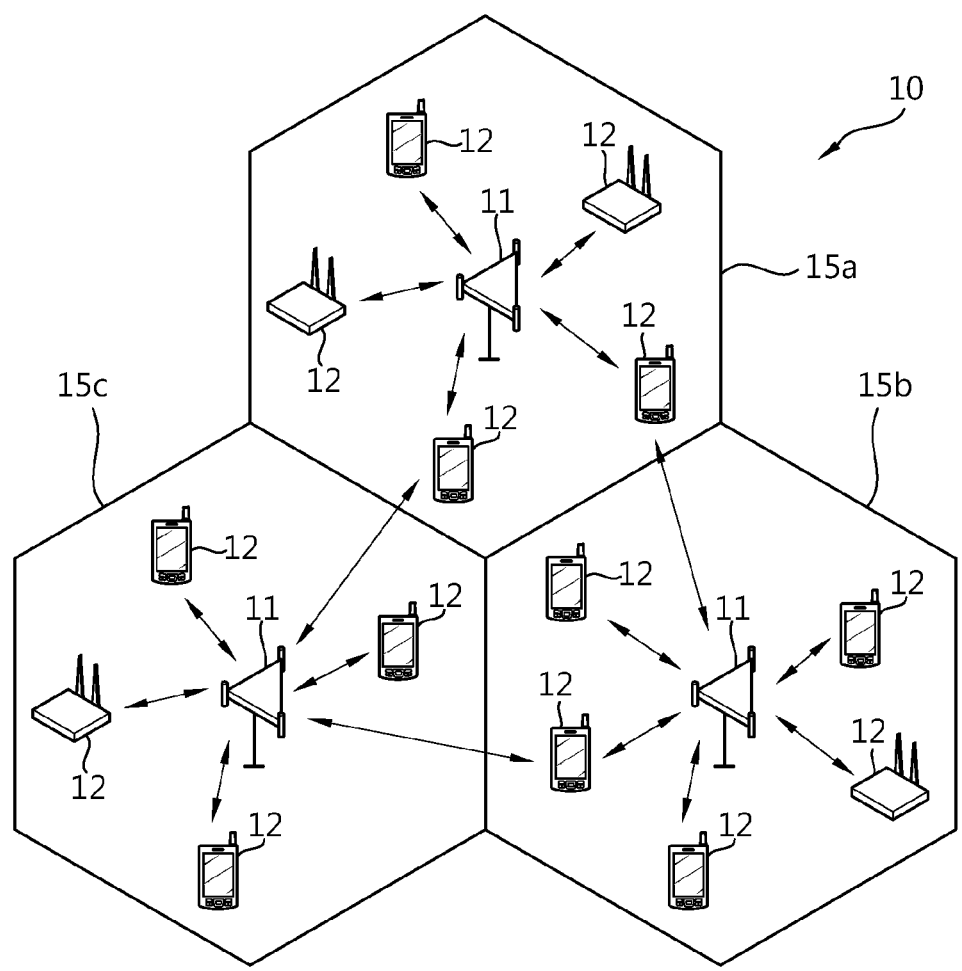
FIG. 1 shows a wireless communication system.

FIG. 1 shows a wireless communication system. A wireless communication system 10 includes one or more Base Stations (BSs) 11. The BS 11 provides communication services to specific geographical areas (commonly called a cell) 15a, 15b, and 15c, respectively. The cell may be divided into a number of areas (called sectors).

A User Equipment (UE) 12 may be fixed or mobile. The UE may be called another terminology, such as an MS (mobile station), an MT (mobile terminal), a UT (user terminal), an SS (subscriber station), a wireless device, a PDA (personal digital assistant), a wireless modem, or a handheld device.

The BS 11 can refer to a fixed station which communicates with the UE 12. The BS may also be called another terminology, such as an eNB (evolved-NodeB), a BTS (Base Transceiver System), or an access point.

Hereinafter, downlink refers to communication from a BS to a UE, and uplink refers to communication from a UE to a BS. In downlink, a transmitter may be part of a BS, and a receiver may be part of a UE. In uplink, a transmitter may be part of a UE, and a receiver may be part of a BS.

Figure 2:
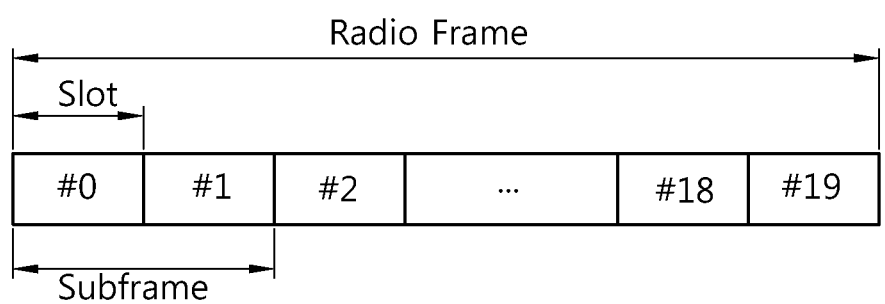
FIG. 2 shows the structure of a radio frame in 3GPP LTE.

FIG. 2 shows the structure of a radio frame in 3GPP LTE. A radio frame is composed of 10 subframes. One subframe consists of 2 slots. The time taken to transmit one subframe is called a TTI (transmission time interval). For example, the length of one subframe may be 1 ms, and the length of one slot may be 0.5 ms.

One slot includes a plurality of OFDM (orthogonal frequency division multiplexing) symbols in the time domain. One slot includes 7 OFDM symbols in a normal CP (Cyclic Prefix), and 1 slot includes 6 OFDM symbols in an extended CP.

An OFDM symbol is used to represent one symbol duration in the time domain because a 3GPP LTE system adopts OFDMA in downlink. The OFDM symbol may be said to be an SC-FDMA symbol or a symbol duration according to a multiple access method.

A resource block is a resource allocation unit in 3GPP LTE, and the resource block includes a plurality of consecutive subcarriers (e.g., 12 subcarriers) in one slot.

As disclosed in 3GPP TS 36.211 V8.5.0 (2008-12) "Evolved Universal Terrestrial Radio Access (E-UTRA); Physical Channels and Modulation (Release 8)", in LTE, the physical channels may be divided into a PDSCH (Physical Downlink Shared Channel) and a PUSCH (Physical Uplink Shared Channel) which are data channels and a PDSCH (Physical Downlink Control Channel) and a PUCCH (Physical Uplink Control Channel) which are control channels.

Figure 3:
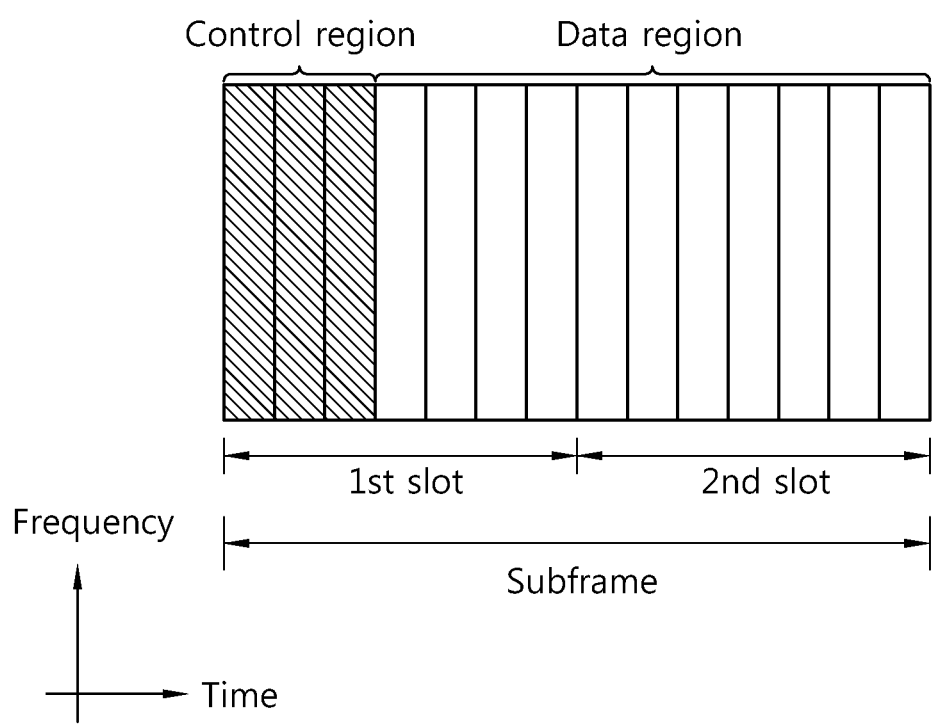
FIG. 3 shows the structure of a downlink subframe in 3GPP LTE.

FIG. 3 shows the structure of a downlink subframe in 3GPP LTE. The subframe is divided into a control region and a data region in the time domain. The control region includes a maximum of 3 OFDM symbols in the first slot of the subframe, but the number of OFDM symbols included in the control region may be changed. PDCCHs are allocated to the control region, and PDSCHs are allocated to the data region.

The PDCCH may carry PDSCH resource allocation (this is also called a downlink grant), PUSCH resource allocation (this is also called an uplink grant), a set of transmit power control commands for UEs within a certain UE group, the activation of a VoIP (Voice over Internet Protocol) and so on.

Figure 4:
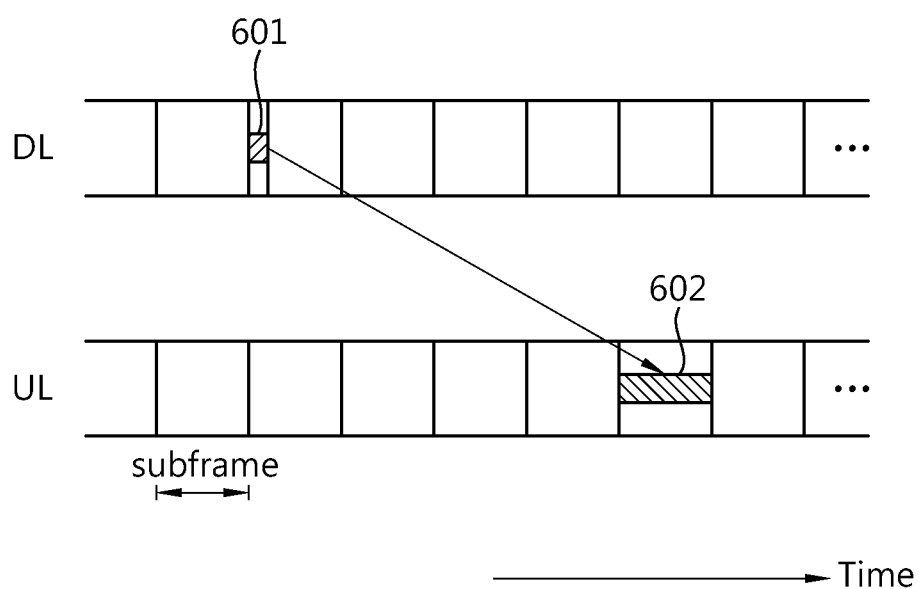
FIG. 4 is an exemplary diagram showing the transmission of uplink data.

FIG. 4 is an exemplary diagram showing the transmission of uplink data. A UE monitors a PDCCH in a downlink subframe and receives uplink resource allocation over a PDCCH 601. The UE transmits uplink data over a PUSCH 602 configured based on the uplink resource allocation.

Figure 5:
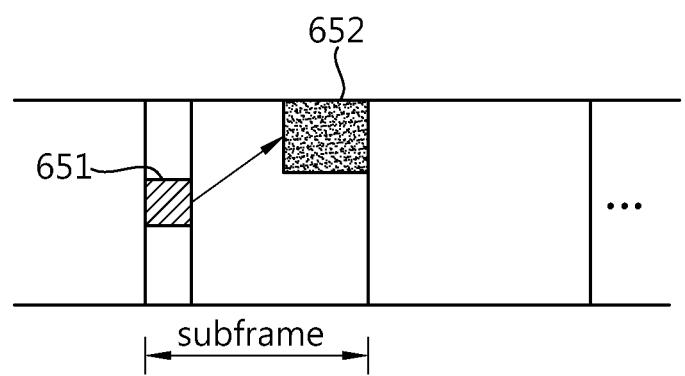
FIG. 5 is an exemplary diagram showing the reception of downlink data.

FIG. 5 is an exemplary diagram showing the reception of downlink data. A UE receives downlink data over a PDSCH 652 indicated by a PDCCH 651. A UE monitors the PDCCH 651 in a downlink subframe and receives downlink resource allocation over the PDCCH 651. A UE receives downlink data over the PDSCH 652 indicated by the downlink resource allocation.

Figure 6:
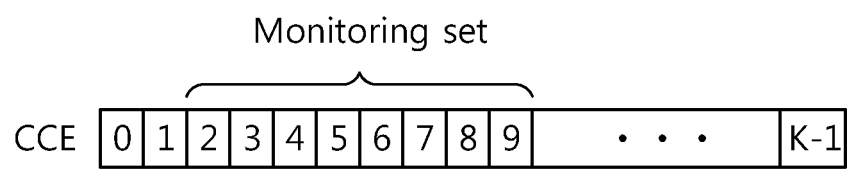
FIG. 6 is an exemplary diagram showing the monitoring of a PDCCH.
Figure 6:
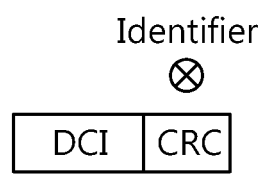

FIG. 6 is an exemplary diagram showing the monitoring of a PDCCH. For the monitoring of a PDCCH, reference can be made to Section 9 of 3GPP TS 36.213 V8.5.0 (2008-12).

A control region within a subframe includes a plurality of CCEs (control channel element). The CCE is a logical allocation unit which is used to provide a PDCCH with the coding rate according to the state of a radio channel. The CCE corresponds to a plurality of resource element groups. The format of the PDCCH and the number of available bits of the PDCCH are determined according to the number of CCEs and the association of the coding rate provided by the CCEs.

A plurality of PDCCHs can be transmitted within one subframe. A UE monitors a plurality of PDCCHs every subframe. Here, monitoring means that a UE attempts to decode each of the PDCCHs according to the format of the monitored PDCCH. In the control region within the subframe, a BS does not provide a UE with information about where a relevant PDCCH is placed. The UE detects its own PDCCH by monitoring an aggregation of PDCCH candidates within the control region. This is called blind decoding. For example, if a CRC (Cyclic Redundancy Check) error is not detected after demasking its own C-RNTI (Cell-Radio Network Temporary Identifier) in a PDCCH, a UE detects the corresponding PDCCH as a own PDCCH having its own DCI (downlink control information).

It is assumed that a control region includes K CCEs. A UE monitors PDCCHs in relation to CCEs within respective monitoring sets allocated thereto. The monitoring set within the control region, detected by the UE, is called search space. The search space includes a UE-specific search space in which a UE searches for its own PDCCH and a common search space in which a UE searches for a PDCCH carrying common information.

A multiple carrier system is described below.

A 3GPP LTE system supports an instance where a downlink bandwidth and an uplink bandwidth are differently set, but one carrier is a precondition for such support. It means that the 3GPP LTE system supports only an instance where the downlink bandwidth is equal to or different from the uplink bandwidth in the state in which one carrier is defined for each of downlink and uplink. For example, a 3GPP LTE system may support a maximum of 20 MHz bandwidth and supports only one carrier in uplink and downlink although the uplink bandwidth may differ from the downlink bandwidth.

A spectrum aggregation (or a bandwidth aggregation, also called a carrier aggregation) supports a plurality of carriers. The spectrum aggregation is introduced in order to support an increased throughput, prevent an increase of the costs due to the use of a broadband RF (radio frequency) device, and guarantee compatibility with the existing system. For example, if 5 carriers are allocated as the granularity of a carrier unit having a 20 MHz bandwidth, a maximum of a 100 MHz bandwidth can be supported.

The spectrum aggregation may be divided into a contiguous spectrum aggregation in which the aggregation is performed between continuous carriers in the frequency domain and a non-contiguous spectrum aggregation in which the aggregation is performed between discontinuous carriers. The number of aggregated carriers in downlink and the number of aggregated carriers in uplink may be differently set. A case where the number of downlink carriers is equal to the number of uplink carriers is called a symmetric aggregation, and a case where the number of downlink carriers is different from the number of uplink carriers is called an asymmetric aggregation.

Multiple carriers may have different sizes (i.e., bandwidths). For example, assuming that 5 carriers are used to compose a 70 MHz band, the 5 carriers may have a construction, such as a 5 MHz carrier (carrier #0)+a 20 MHz carrier (carrier #1)+a 20 MHz carrier (carrier #2)+a 20 MHz carrier (carrier #3)+a 5 MHz carrier (carrier #4).

A multiple carrier system hereinafter refers to a system supporting multiple carriers based on the spectrum aggregation. In the multiple carrier system, the contiguous spectrum aggregation or the non-contiguous spectrum aggregation or both may be used. Furthermore, either the symmetric aggregation or the asymmetric aggregation may be used.

For clarity, 3 carriers are taken into account. However, the number of carriers is not limited. Furthermore, the transmission of a PDCCH-PDSCH pair is taken into account in a downlink carrier, but a person having ordinary skill in the art may easily apply the transmission of the PDCCH-PDSCH pair to the transmission of a PDCCH-PUSCH pair.

Figure 7:
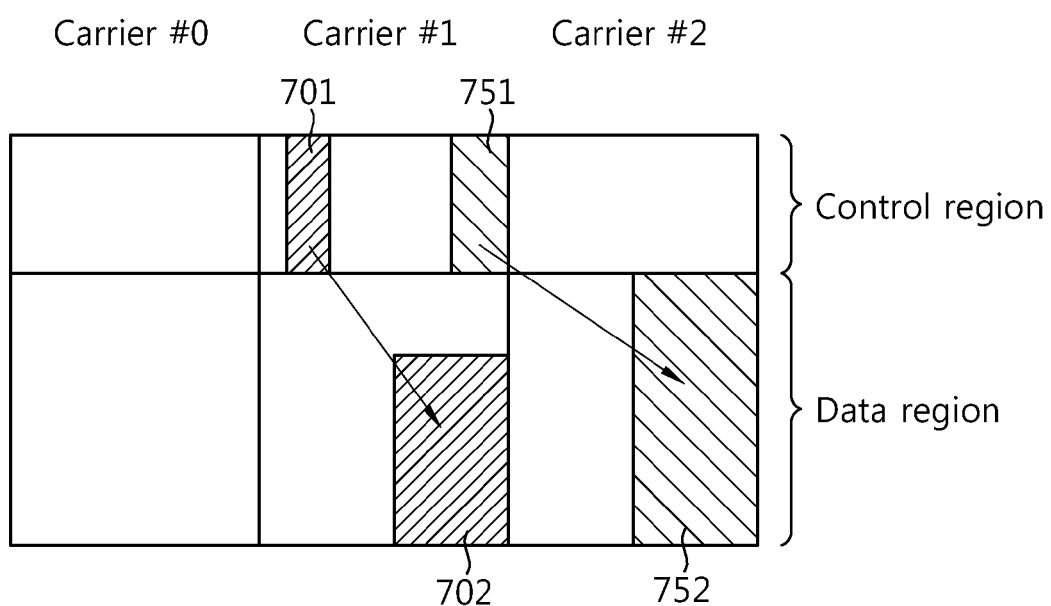
FIG. 7 shows an example of separate coding.

FIG. 7 shows an example of separate coding. Separate coding means that one PDCCH can carry downlink allocation for a PDSCH for one carrier. That is, the PDCCH and the PDSCH correspond to each other in a one-to-one way.

A first PDCCH 701 carries downlink allocation for a first PDSCH 702. It means that the first PDCCH 701 and the first PDSCH 702 are transmitted over the same carrier, thereby being capable of providing backward compatibility with the conventional LTE.

A second PDCCH 751 carries downlink allocation for a second PDSCH 752. It means that the second PDCCH 751 and the second PDSCH 752 are transmitted through different carriers. The DCI of the second PDCCH 751 may include an indicator for a carrier #2 over which the second PDSCH 752 is transmitted.

Figure 8:
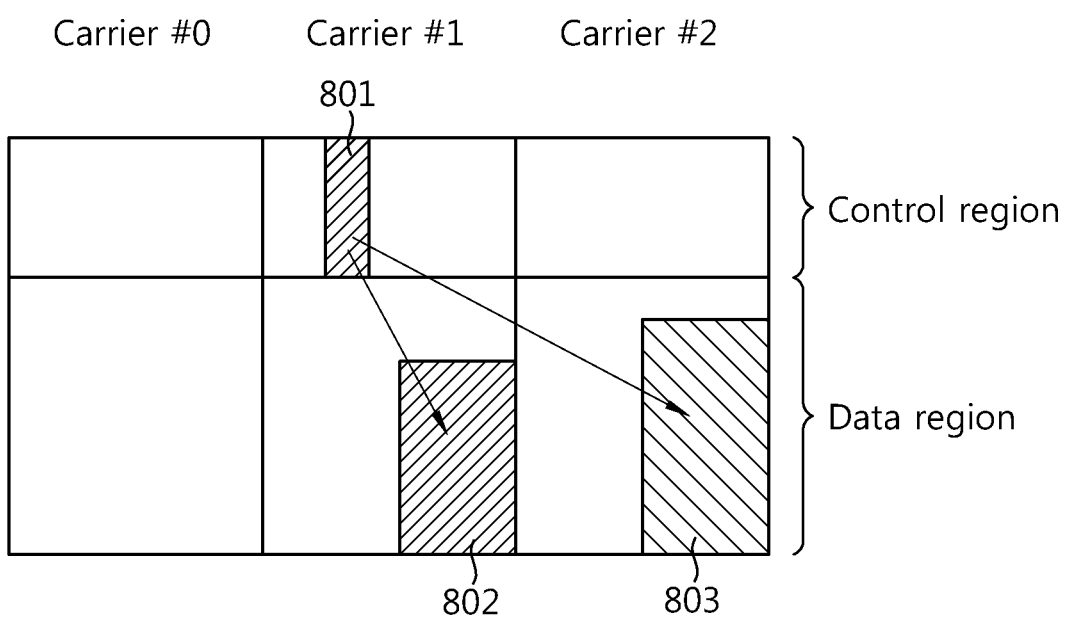
FIG. 8 shows an example of joint coding.

FIG. 8 shows an example of joint coding. Joint coding refers to that one PDCCH can carry downlink allocation for the PDSCH of one or more carriers.

A PDCCH 801 carries downlink allocation for the PDSCH 802 of a carrier #1 and the PDSCH 803 of a carrier #2.

Carrier hopping proposed by the present invention is now described.

A primary carrier or a reference carrier is a carrier aggregation so that a UE (or a cell or a UE group) monitors a PDCCH. The reference carrier may be set in a cell-specific, a UE-specific, or a UE group-specific way. A plurality of the reference carriers may be set for each UE. For example, assuming that the entire system includes a total of 5 carriers, a BS may allocate only three of the five carriers to a UE and may designate one or more of the three allocated carriers as UE-specific reference carriers.

It is hereinafter assumed that there are a total of three downlink carriers and one of the three downlink carriers is set as a reference carrier. However, this is only illustrative, and the number of carriers or the number of reference carriers is not limited.

Figure 9:
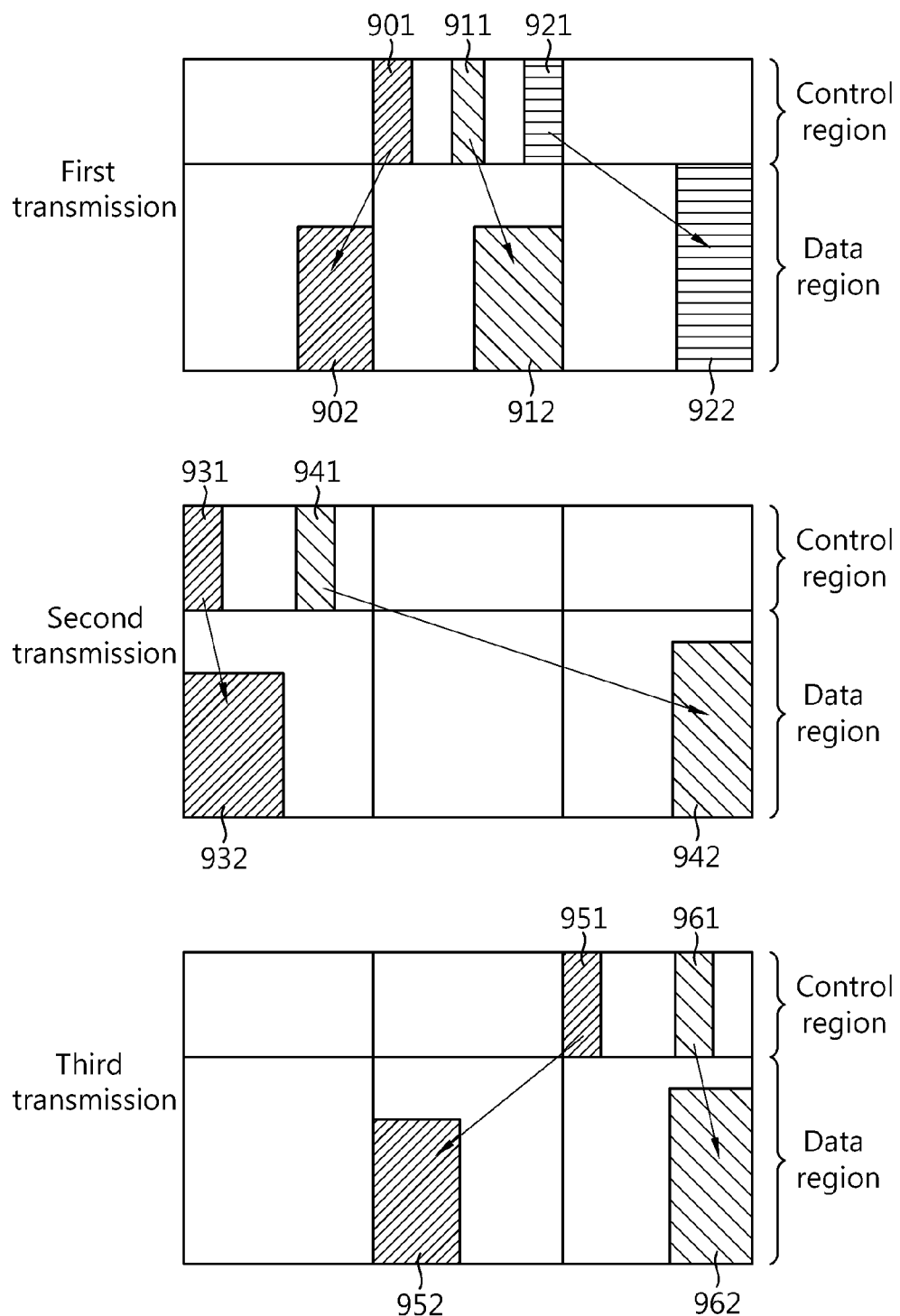
FIG. 9 shows an example of carrier hopping.

FIG. 9 shows an example of carrier hopping. This example corresponds to an instance where separate coding is used.

It is assumed that at the early stage, a reference carrier is set as a carrier #1. A first PDCCH 901, a second PDCCH 911, and a third PDCCH 921 are transmitted through the reference carrier. The first PDCCH 901 carries resource allocation for a first PDSCH 902 over a carrier #0, the second PDCCH 911 carries resource allocation for a second PDSCH 912 over a carrier #1, and the third PDCCH 921 carries resource allocation for a third PDSCH 922 over a carrier #2.

In second transmission, the reference carrier switches to the carrier #0. That is, a UE monitors its own PDCCH in the carrier #0.

In third transmission, the reference carrier switches to the carrier #2.

Figure 10:
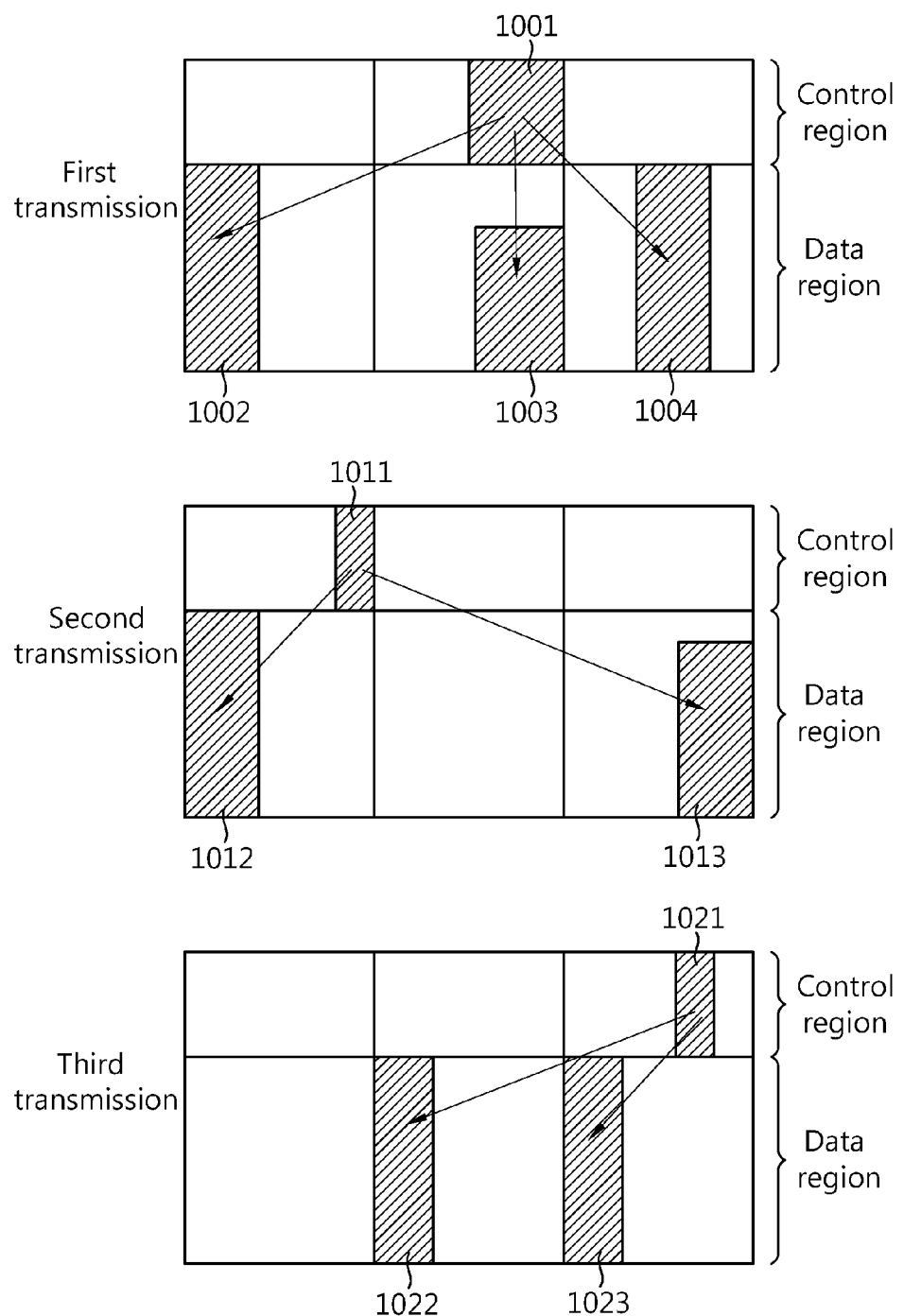
FIG. 10 shows another example of carrier hopping.

FIG. 10 shows another example of carrier hopping. This example corresponds to an instance where joint coding is used.

It is assumed that at the early stage, a reference carrier is set as a carrier #1. A PDCCH 1001 is transmitted through the reference carrier. A PDCCH 1011 carries resource allocation for a first PDSCH 1002 over a carrier #0, resource allocation for a second PDSCH 1003 over a carrier #1, and resource allocation for a third PDSCH 1004 over a carrier #2.

In second transmission, the reference carrier switches to the carrier #0. That is, a UE monitors its own PDCCH in the carrier #0.

In third transmission, the reference carrier switches to the carrier #2.

In the embodiments of FIGS. 9 and 10, the period where carrier hopping is carried out may be a subframe unit, a plurality of subframe units, or a radio frame unit.

When an HARQ (Hybrid Automatic Repeat Request) is applied, the first transmission may correspond to the early transmission, and the second transmission and the third transmission may correspond to first retransmission and second retransmission, respectively.

In multiple carriers, the traffic of a control channel or a data channel may be concentrated on a specific carrier on a specific time. A probability that traffic is concentrated can be reduced by switching a reference carrier over which a control channel is transmitted through carrier hopping.

In multiple carriers, channels experienced by respective carriers are commonly different. A degradation of service due to a deterioration of a channel of a specific carrier can be prevented and a diversity gain can be obtained through the carrier hopping.

A hopping pattern defines rules in which a reference carrier is switched between carriers. If a plurality of carriers is used as a reference carrier, a switch pattern can be defined between a plurality of carriers used as the reference carrier or between carriers not used as the reference carrier or both.

A variety of methods below are possible in order to switch the reference carrier between a plurality of carriers.

As a first example, a reference carrier is initially set based on an SFN (system frame number). The hopping pattern of the reference carrier may be defined according to the initially used SFN.

As a second example, the indices of 10 subframes included in a radio frame may be used to set a reference carrier. Here, the hopping pattern of the reference carrier may be defined according to the offset value of a subframe index and the number of carriers (or available carriers) supported by a relevant UE.

As a third example, during a specific duration (e.g., one radio frame), a hopping pattern between carriers may be defined. The hopping pattern may be valid only during the specific duration. Alternatively, the hopping pattern may be changed periodically or aperiodically.

The period in which the reference carrier is changed may be determined according to the number of available hopping patterns which are used during the specific duration. For example, assuming that 10 hopping patterns exist during one radio frame, the reference carrier may be switched on a subframe basis. For another example, assuming that 5 hopping pattern exist during one radio frame, the reference carrier may be switched on a two-subframe basis.

The period where the reference carrier is switched may be determined according to a subframe unit, a subframe group unit, a synchronization signal transmission period, a radio frame unit, and/or a system information transmission period, such as a PBCH.

As a fourth example, the switch of the reference carrier may be performed based on a carrier index. For example, the reference carrier may be switched based on the indices of carriers selected as the reference carrier by alternately changing the indices in ascending powers or in descending powers. The carrier index may be a physical index or a logical index. Assuming that the number of all carriers in a system is 5 and all the carriers are assigned 0 to 4 physical indices, a reference carrier may be switched on the basis of the physical indices. Alternatively, assuming that the number of all carriers in a system is 5 and the number of carriers available for a UE is 3, the available carriers are assigned 0 to 2 logical indices, and a reference carrier may be switched on the basis of the logical indices.

As a fifth example, a BS may inform a UE of a hopping pattern or whether a carrier has been switched implicitly or explicitly. The BS may inform the UE of the hopping pattern or whether the carrier has been switched through RRC (radio resource control) signaling, system information, the DCI of a PDCCH or the like.

As a sixth example, a BS may switch a reference carrier to a carrier having a good channel according to channel conditions of each carrier. A BS can check the channel conditions of each carrier by using pieces of channel information, such as a CQI (Channel Quality Indicator), a power level, and an interference level which are reported by a UE.

As a seventh example, the hopping pattern may be defined so that the reference carrier is substantially switched between a plurality of carriers at the same ratio. The reference carrier may be switched by shifting carrier indices. Assuming that there are 0 to 2 carrier indices and a carrier having an index 1 is a reference carrier, the reference carrier may be switched like 1->0->2->1->0. Alternatively, the hopping pattern may be defined in a specific index order by using a random sequence.

As an eighth example, a hopping pattern may be defined on the basis of a specific carrier. Assuming that there are 0 to 2 carrier indices and a carrier having an index 1 is a reference carrier, the reference carrier may be switched on the basis of the initially set carrier like 1->0->1->2->1->0.

As a ninth example, a plurality of hopping patterns may be allocated to each UE. The hopping patterns may be allocated to a UE as many the number of aggregation levels for allowing the UE to monitor a PDCCH and the number of DCI formats. Alternatively, the hopping patterns may be allocated to a UE as many as the number of PDCCHs on which the UE can perform blind decoding.

As a tenth example, sequence pairing may be taken into account when the hopping pattern is allocated. In sequence pairing, after the same number of hopping patterns is allocated to each UE without considering the UE's capability to support multiple carriers, the UE can use the hopping patterns according to its capability.

As an eleventh example, a hopping pattern may have a form of a carrier set of indices which are used (not used) as a reference carrier. The hopping pattern may inform the indices of carriers from which a PDCCH can be monitored like a masking sequence. The hopping pattern may include a subframe index so that the PDCCH is not monitored in a specific subframe (or a subframe set). Alternatively, the hopping sequence may indicate a carrier not used so that a PDCCH is not monitored in the relevant carrier.

As a twelfth example, a hopping pattern may have a predetermined table form so that a BS informs a UE of the index of the hopping pattern within the table and thus the hopping pattern can be set. Alternatively, a BS may dynamically generate a hopping pattern and inform a UE of the generated hopping pattern.

As a thirteenth example, a plurality of carriers may be used as a reference carrier. Here, the switch of the reference carrier may be performed between a plurality of carriers or between a plurality of carriers and another carrier. For example, it is assumed that there are a total of carriers having indices 0 to 4 and the carriers having the indices 1 and 2 from among the total of carriers are selected as a reference carrier. The reference carrier may be exchanged between the carriers having the indices 1 and 2 or between the carriers having the indices 0 to 4.

The above examples may be implemented in combination, and the examples are not limited to the sequence of the description.

Since the reference carrier is switched dynamically or according to a specific period, the concentration of control channel traffic on a specific carrier can be prevented, and a diversity gain can be obtained.

Figure 11:
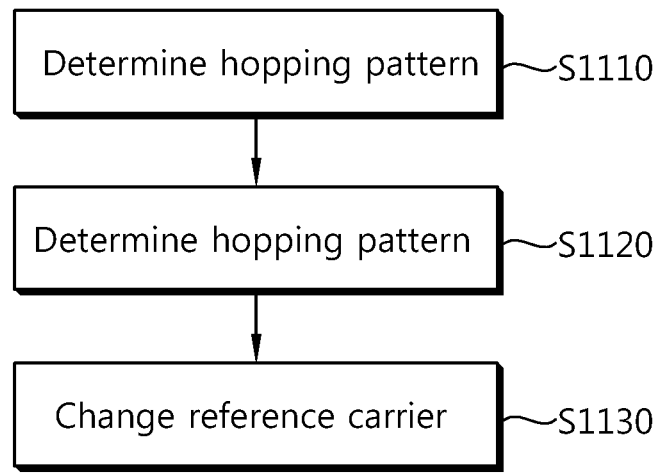
FIG. 11 is a flowchart illustrating a communication method in a multiple carrier system.

FIG. 11 is a flowchart illustrating a communication method in a multiple carrier system.

A UE determines a hopping pattern for switching a reference carrier for monitoring a control channel at step S1110. The hopping pattern may be determined according to the various methods and may be received from a BS.

The UE determines a first carrier, selected from among a plurality of carriers, as the reference carrier at step S1120. The UE monitors the control channel over the reference carrier.

Next, the UE switches the reference carrier to a second carrier, selected from among the plurality of carriers, based on the hopping pattern at step S1130. The hopping pattern may indicate a periodic switching of the reference carrier.

Figure 12:
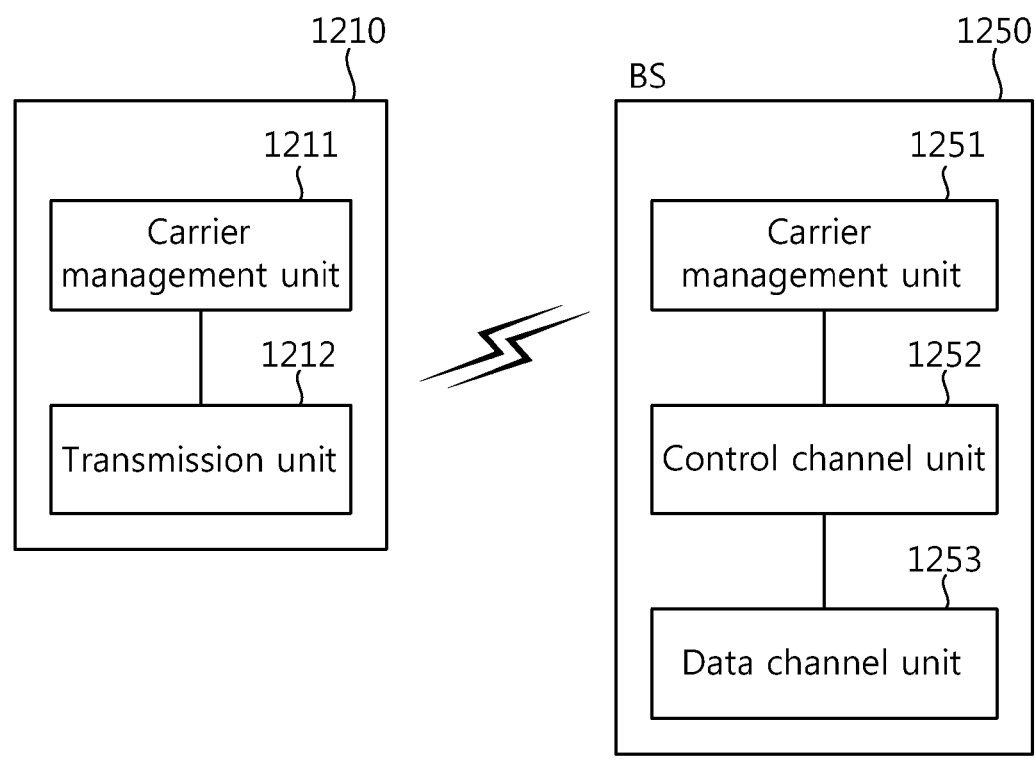
FIG. 12 is a block diagram showing a wireless communication system in which the embodiment of the present invention is implemented.

FIG. 12 is a block diagram showing a wireless communication system in which the embodiment of the present invention is implemented.

A BS 1210 includes a carrier management unit 1211 and a transmission unit 1212.

The carrier management unit 1211 manages a plurality of carriers and implements the above-described carrier hopping methods. More particularly, the carrier management unit 1211 may switch a carrier used as a reference carrier and send information about the switched carrier to a UE. The carrier management unit 1211 may determine or generate a hopping pattern for switching the reference carrier and send information about the hopping pattern to the UE.

The transmission unit 1212 is a functional medium for configuring a control channel (i.e., a PDCCH) and for transmitting the control channel over a reference carrier. Furthermore, the transmission unit 1212 may configure a data channel (i.e., a PDSCH) and transmit the data channel over at least one of a plurality of carriers.

A UE 1250 is a wireless device for multiple carriers, and it includes a carrier management unit 1251, a control channel unit 1252, and a data channel unit 1253.

The carrier management unit 1251 manages a plurality of carriers and implements the above-described carrier hopping methods. The carrier management unit 1251 may determine a reference carrier and switch the reference carrier to a carrier used as the reference carrier, from among a plurality of carriers. The carrier switch methods may be implemented by the carrier management unit 1251.

The control channel unit 1252 monitors a control channel over a reference carrier.

The data channel unit 1253 may receive a data packet over a downlink data channel (i.e., a PDSCH) or transmit a data packet over an uplink data channel (i.e., a PUSCH) using resource allocation received over a control channel.

In the above-described exemplary systems, although the methods have been described on the basis of the flowchart using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of illustrations. Although all kinds of possible combinations for representing the various aspects may not be described, a person having ordinary skill in the art will understand that other possible combinations are possible. For example, a person having ordinary skill in the art may use each of the elements described in the embodiments in such a way as to combine the elements. Accordingly, the present invention is not to be limited to the embodiments, but is intended to cover the widest range which complies with the disclosed principles and new characteristics.

The invention claimed is:

1. A wireless device for a multiple carrier system, the wireless device comprising:
   a carrier management unit for determining at least one carrier of a plurality of downlink carriers as a reference carrier for monitoring a control channel; and
   a control channel unit for monitoring the control channel over the reference carrier,
   wherein:
   the carrier management unit switches the reference carrier to at least one of remaining downlink carriers of the plurality of downlink carriers;
   a resource allocation of a physical downlink shared channel (PDSCH) included in the plurality of downlink carriers is determined by a physical downlink control channel (PDCCH) included in the reference carrier switched to by the carrier management unit;
   the reference carrier is a bandwidth selected by a base station to transmit the PDCCH;
   the PDSCH is a data channel used by the base station; and
   the PDCCH is a control channel used by the base station.

2. The wireless device of claim 1, wherein the carrier management unit switches the reference carrier to at least one of the remaining downlink carriers according to an indication received from the base station.

3. The wireless device of claim 1, wherein the carrier management unit switches the reference carrier to at least one of the remaining downlink carriers based on carrier indices for the plurality of downlink carriers.

4. The wireless device of claim 1, wherein the carrier management unit switches the reference carrier to at least one of the remaining downlink carriers based on a hopping pattern.

5. The wireless device of claim 1, wherein the carrier management unit periodically switches the reference carrier to at least one of the remaining downlink carriers.

6. The wireless device of claim 5, wherein a period when the reference carrier is switched to at least one of the remaining downlink carriers is indicated by the base station.

7. The wireless device of claim 5, wherein the carrier management unit periodically switches the reference carrier to at least one of the remaining downlink carriers in a unit of a subframe.

8. The wireless device of claim 1, further comprising a data channel unit for transmitting a data packet over a downlink data channel or an uplink data channel by using the resource allocation received on the control channel.

9. The wireless device of claim 8, wherein the control channel is subjected to separate coding.

10. A communication method in a multiple carrier system, the communication method comprising:
    determining, at a mobile terminal, a hopping pattern for switching a reference carrier for monitoring a control channel;
    determining, at the mobile terminal, a first carrier, selected from among a plurality of carriers, as the reference carrier; and
    monitoring, at the mobile terminal, the control channel over the reference carrier and switching the reference carrier to a second carrier, selected from among the plurality of carriers, based on the hopping pattern,
    wherein:
    a resource allocation of a physical downlink shared channel (PDSCH) included in the first carrier and the second carrier is determined by a physical downlink control channel (PDCCH) included in the first carrier when the first carrier is selected as the reference carrier;
    a resource allocation of a PDSCH included in the first carrier and the second carrier is determined by a PDCCH included in the second carrier when the second carrier is selected as the reference carrier;
    the reference carrier is a bandwidth selected by a base station to transmit PDCCH data that is control channel data generated by the base station;
    the PDSCH is a data channel used by the base station; and
    the PDCCH is a control channel used by the base station.

11. The communication method of claim 10, wherein the switching of the reference carrier is periodically performed.

12. A base station for a multiple carrier system, the base station comprising:
    a carrier management unit for determining at least one carrier of a plurality of downlink carriers as a reference carrier for transmitting a control channel; and
    a transmission unit for transmitting the control channel over the reference carrier,
    wherein:

the carrier management unit switches the reference carrier to at least one of remaining downlink carriers of the plurality of downlink carriers;

a resource allocation of a physical downlink shared channel (PDSCH) included in the plurality of downlink carriers is determined by a physical downlink control channel (PDCCH) included in the reference carrier switched to by the carrier management unit;

the reference carrier is a bandwidth selected by a base station to transmit the PDCCH;

the PDSCH is a data channel used by the base station; and the PDCCH is a control channel used by the base station.

13. The base station of claim 12, wherein the carrier management unit switches the reference carrier based on channel conditions of each of the plurality of downlink carriers.

14. The base station of claim 12, wherein the carrier management unit transmits information about the reference carrier to a user equipment.

* * * * *